(12) United States Patent
Norton

(10) Patent No.: US 10,772,312 B1
(45) Date of Patent: Sep. 15, 2020

(54) SYSTEM FOR ATTRACTING AND CATCHING FISH

(71) Applicant: Amir Norton, Denver, CO (US)

(72) Inventor: Amir Norton, Denver, CO (US)

( * ) Notice: Subject to any disclaimer, the term of this patent is extended or adjusted under 35 U.S.C. 154(b) by 379 days.

(21) Appl. No.: 15/497,173

(22) Filed: Apr. 25, 2017

Related U.S. Application Data

(60) Provisional application No. 62/327,147, filed on Apr. 25, 2016.

(51) Int. Cl.
*A01K 91/06* (2006.01)
*A01K 89/012* (2006.01)
*A01K 99/00* (2006.01)
*A01K 89/00* (2006.01)

(52) U.S. Cl.
CPC ............ *A01K 91/065* (2013.01); *A01K 89/00* (2013.01); *A01K 89/012* (2013.01); *A01K 99/00* (2013.01)

(58) Field of Classification Search
CPC .............. A01K 89/012; A01K 89/017; A01K 89/0183; A01K 91/065; A01K 91/06; A01K 99/00
USPC ............... 43/4.5, 19.2, 20, 21; 242/225, 250
See application file for complete search history.

(56) References Cited

U.S. PATENT DOCUMENTS

| | | | | |
|---|---|---|---|---|
| 2,707,843 A | * | 5/1955 | Howe | A01K 91/065 43/26.1 |
| 2,714,271 A | * | 8/1955 | Stratton | A01K 89/0193 43/21 |
| 3,030,046 A | * | 4/1962 | Markoff-Moghadam | A01K 89/017 242/250 |
| 3,411,230 A | * | 11/1968 | Hopper | A01K 89/01086 242/225 |
| 3,459,387 A | * | 8/1969 | Miyamae | A01K 89/01141 242/225 |
| 4,021,003 A | * | 5/1977 | Watkins | A01K 89/017 242/250 |
| 4,283,025 A | * | 8/1981 | Whisenhunt | A01K 89/017 242/250 |
| 4,598,878 A | * | 7/1986 | Steffan | A01K 89/017 242/249 |
| 4,634,072 A | * | 1/1987 | Stealy | A01K 89/012 242/225 |
| 4,680,885 A | * | 7/1987 | Lindell | A01K 91/065 43/19.2 |
| 4,739,944 A | * | 4/1988 | Atwell | A01K 89/012 242/225 |
| 5,004,181 A | * | 4/1991 | Fowles | A01K 87/08 242/225 |

(Continued)

FOREIGN PATENT DOCUMENTS

| | | | | |
|---|---|---|---|---|
| CA | 2774217 A1 | * | 10/2013 | ............. A01K 97/11 |
| GB | 1025415 A | * | 4/1966 | ........... A01K 89/017 |

(Continued)

OTHER PUBLICATIONS

Translation of JP 03-219825 (Year: 1991).*
Translation of JP 07-170891 (Year: 1995).*
Translation of JP 2000-023601 (Year: 2000).*

*Primary Examiner* — Darren W Ark

(57) ABSTRACT

In embodiments of a system for attracting and catching fish, a motor that's operationally coupled to a fishing reel is operated according to a predetermined motion profile in order to impart detailed and lifelike motion to a bait.

13 Claims, 6 Drawing Sheets

(56) References Cited

U.S. PATENT DOCUMENTS

| | | | | |
|---|---|---|---|---|
| 5,088,657 A * | 2/1992 | Chen | .................... | A01K 89/006 242/225 |
| 5,556,047 A * | 9/1996 | Nanbu | ................. | A01K 89/017 242/250 |
| 5,878,523 A * | 3/1999 | Wenzel | ............. | A01K 89/0105 43/21 |
| 6,012,665 A * | 1/2000 | Olona | .................. | A01K 89/012 242/250 |
| 6,056,219 A * | 5/2000 | Barkley | ............... | A01K 89/012 242/225 |
| 6,126,104 A * | 10/2000 | Kellerman | ........... | A01K 89/012 242/225 |
| 6,220,538 B1 * | 4/2001 | Durso | ................. | A01K 91/065 242/250 |
| 6,318,653 B1 * | 11/2001 | Dobbins | .............. | A01K 89/012 242/225 |
| 6,449,895 B1 * | 9/2002 | Zabihi | .................... | A01K 91/10 43/21 |
| 6,588,137 B1 * | 7/2003 | Rozkowski | ............ | A01K 97/01 43/17 |
| 6,634,134 B1 * | 10/2003 | Nyquist | ................. | A01K 91/02 43/16 |
| 6,880,775 B1 * | 4/2005 | Wenzel | ............ | A01K 89/01121 242/225 |
| 7,086,622 B1 * | 8/2006 | Whaley | ................. | A01K 97/00 242/323 |
| 7,269,922 B1 * | 9/2007 | Mack | .................. | A01K 87/007 43/21 |
| 7,309,039 B1 * | 12/2007 | Stone | .................. | A01K 89/017 242/225 |
| 7,946,076 B2 * | 5/2011 | Gascoigne | ............ | A01K 97/01 43/4.5 |
| 8,832,990 B2 * | 9/2014 | Morris | ................. | A01K 89/017 43/21 |
| 10,165,767 B1 * | 1/2019 | Sandstrom | ........... | A01K 89/017 |
| 10,271,529 B2 * | 4/2019 | Numata | ........... | A01K 89/01555 |
| 2011/0209383 A1 * | 9/2011 | Tennyson | ............ | A01K 89/017 43/21 |
| 2015/0335001 A1 * | 11/2015 | Miyamae | ............. | A01K 89/012 242/250 |
| 2018/0279593 A1 * | 10/2018 | DeFreitas | ............ | A01K 89/012 |
| 2019/0045765 A1 * | 2/2019 | Ji | ......................... | A01K 89/017 |
| 2019/0110454 A1 * | 4/2019 | Hamade | ............ | A01K 89/0186 |
| 2019/0183103 A1 * | 6/2019 | Hamade | ............... | A01K 89/017 |

FOREIGN PATENT DOCUMENTS

| | | | | |
|---|---|---|---|---|
| GB | 1210983 A | * | 11/1970 | .......... A01K 89/012 |
| GB | 1336106 A | * | 11/1973 | .......... A01K 89/017 |
| JP | 02207729 A | * | 8/1990 | |
| JP | 02312533 A | * | 12/1990 | |
| JP | 03219824 A | * | 9/1991 | |
| JP | 03219825 A | * | 9/1991 | |
| JP | 04023934 A | * | 1/1992 | |
| JP | 04135435 A | * | 5/1992 | |
| JP | 04281732 A | * | 10/1992 | |
| JP | 07170891 A | * | 7/1995 | |
| JP | 09107853 A | * | 4/1997 | |
| JP | 2000023601 A | * | 1/2000 | |
| JP | 2000300130 A | * | 10/2000 | |
| JP | 2001120130 A | * | 5/2001 | |
| JP | 2001128597 A | * | 5/2001 | |
| JP | 2002000145 A | * | 1/2002 | |
| JP | 2002233279 A | * | 8/2002 | |
| JP | 2002247941 A | * | 9/2002 | |
| JP | 2002253091 A | * | 9/2002 | |
| JP | 2004229601 A | * | 8/2004 | |
| JP | 2006223219 A | * | 8/2006 | |
| KR | 20010066925 A | * | 7/2001 | |

* cited by examiner

SYSTEM FOR ATTRACTING AND CATCHING FISH

CROSS-REFERENCE TO RELATED APPLICATIONS

This application claims the benefit of provisional patent application Ser. No. 62/327,147, filed 2016 Apr. 25 by the present inventor.

TECHNICAL FIELD

The present invention relates to fishing, and more specifically to programmably imparting motion to a fishing reel.

BACKGROUND

The following is a tabulation of some prior art that presently appears relevant:

U.S. Patents

| Patent Number | Kind Code | Issue Date | Patentee |
|---|---|---|---|
| 4,752,878 | A | Jun. 21, 1988 | Sigurdsson |
| 6,415,543 | B2 | Jul. 9, 2002 | Keller |
| 8,136,289 | B2 | Mar. 20, 2012 | Modglin |
| 6,220,538 | B1 | Apr. 24, 2001 | Durso |
| 6,634,134 | B1 | Oct. 21, 2003 | Nyquist |

Catching fish is commonly performed using a combination of a fishing reel and rod that support a fishing line with a bait or lure at the end of it. Extensive attention is paid to the type of bait that is used, how it looks, and specifically to how it moves in order to most successfully imitate what fish are normally attracted to eating. A common way to cause the bait to move is through the act of "jigging" where the bait is moved by the fishing line through the action of operating the fishing reel and/or moving the fishing rod. The preferred jigging motion depends on many factors, such as the type of bait that is used, the species of fish sought, the environment being fished, etc. Often-times this jigging is manually performed.

This jigging approach causes various challenges for fishermen. These include having knowledge of what jigging motions are most appropriate for a particular fishing situation, performing such jigging motions properly and repeatedly, having the physical ability to perform the necessary actions, fighting fatigue from continuous jigging, performing these actions on multiple fishing rods simultaneously, etc. Furthermore, such laborious activity takes away from a common goal of wanting to relax and enjoy the outdoors, while being successful at catching fish.

Various attempts have been made at automating jigging. However, these approaches have significant limitations, as discussed below.

U.S. Pat. No. 6,415,543 describes a cam-based device that will produce cyclic motion that oscillates the rod up and down. Such a device, in addition to being bulky and introducing additional setup/take-down time, is limited in the motion it imparts to the bait. Such monotonous repetitive motions do not replicate the finesse of the natural movement that the bait is intended to imitate. Cam-based systems are thus severely limited in both the range of displacement and the actual motion details they generate.

U.S. Pat. No. 8,136,289 describes a jigging device that uses a reciprocating actuator to generate motion at the bait. Similar to U.S. Pat. No. 6,415,543, it too is limited in the range and finesse of motion that it generates and requires carrying bulky equipment and introduces additional setup/take-down time. Furthermore, both described devices require attachment to external support structures, again limiting their convenience and availability for use.

Another device, which is described in U.S. Pat. No. 6,634,134, again requires the use of bulky devices to generate the motion, and an external support to mount to. It attempts to provide more variety in the types of motions it generates by using a motor controlled with a processor. However, due to the inherent mechanical limitations of the rod holder, it can only produce a fairly limited range of displacement. And because of the large amount of mass that has to be moved (rod, reel, rod holder, etc.), it is also severely limited in the finesse of the motion it can generate at the delicate lure. And because this and the previously referenced devices do not compensate for the slack produced in the fishing line by reeling it in, their effectiveness in continuing to impart motion to the bait is significantly reduced.

Other solutions, as proposed in U.S. Pat. Nos. 6,220,538 and 4,752,878 incorporate a motor into a reel. However, they also are very limited in the motions that are produced for the important purpose of imitating the natural motions of a live bait. For example, U.S. Pat. No. 4,752,878 relies on moving the lure to a preset fishing depth and after some period of time moving it to a different preset depth with no attempt to imitate the detailed motion of an attractive bait. U.S. Pat. No. 6,220,538 uses an electronic oscillator to periodically activate the motor to incrementally reel in the bait, albeit with a cyclic and unnatural approach. Although the actions of these described devices result in physically moving the bait, their results do not resemble the natural finesse of a live bait. Furthermore, these devices require using the described specialized reels, rather than allowing fishermen to use their own existing traditional fishing reels.

Accordingly, there is a need for an improved solution for attracting and catching fish that overcomes the limitations of the prior art.

SUMMARY

This Summary introduces features and concepts of attracting and catching fish, which is further described below in the Detailed Description and/or shown in the Figures. This Summary should not be considered to describe essential features of the claimed subject matter, nor used to determine or limit the scope of the claimed subject matter.

In accordance with one embodiment, a motor is operationally coupled to a fishing reel storing a length of fishing line, and the motor is commanded to operate according to a predetermined motion profile.

The resulting rotation of the fishing reel will produce a jigging motion on the fishing line and bait to attract and catch fish. The motions imparted on the bait or lure can be such that they imitate the motions of live bait, thus better attracting fish.

Since the motor is directly coupled to the fishing reel, rather than using additional bulky mechanisms such as rod-holders, a much more detailed level of motion can be imparted on the fishing lure to further attract fish. Furthermore, with a multitude of motion profiles to select from, the fisherman can effortlessly and quickly select the motion profile that is most appropriate for the fishing lure in use or the environment being fished. And with the availability of multiple predetermined motion profiles to select from, a novice fisherman who may normally not know how to perform proper jigging or one who does not have the physical capability to properly and continuously perform jigging, can benefit from this system.

The motor being coupled to the reel allows this solution to not limit the range of displacement of the bait.

In one or more embodiments, the motor assembly can be attached to an existing fishing reel, thus allowing fishermen to use already-owned equipment. Additionally, different motor adapters can be used to mount to different makes and models of fishing reels.

In other embodiments, the motor can be built in as part of the reel mechanism.

Due to the automated nature of this system, jigging can also be performed on fishing reels that are not attended by a fisherman.

In one or more embodiments, additional motion profiles may be added to the list of motion profiles available to the user.

Accordingly, several advantages of one or more aspects are as follows: automate intricate and precise jigging motions, reduce fatigue, reduce physical capability requirements of the fisherman, attract more fish, provide appropriate jigging motions to less-knowledgeable fishermen, and be performed on multiple fishing rods simultaneously. Relief is also provided to fishermen from the laborious requirements of jigging so that they can better relax and enjoy the outdoors. Other advantages of one ore more aspects will be apparent from a consideration of the drawings and ensuing descriptions.

DETAILED DESCRIPTION

Figure 1:
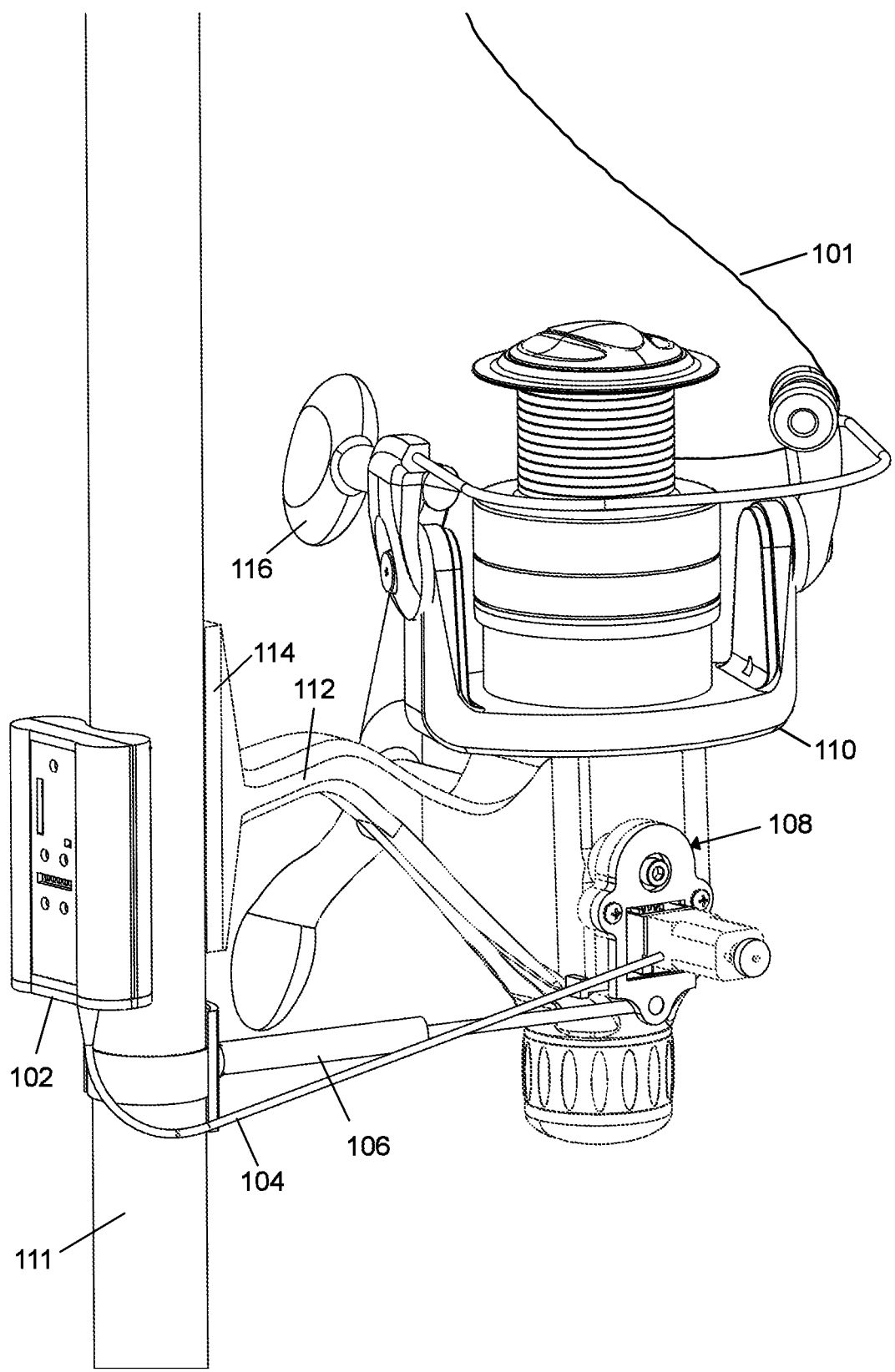
FIG. 1 is a perspective view of an example system to attract and catch fish, according to one illustrated embodiment.

FIG. 1 illustrates a system to attract and catch fish according to one embodiment. This system comprises a fishing reel 110 on which is stored a length of fishing line 101, a motor assembly 108 which is rotationally coupled to fishing reel 110, and user interface 102 which provides control for motor assembly 108. Details of this motor control are discussed further below. Electrical connections between user interface 102 and motor assembly 108 are made through cable 104. Fishing reel 110 is connected to rod 111 according to conventional methods.

User interface 102 can be attached to rod 111 using a hook-and-loop fastener or other appropriate attachment methods.

A stabilization member 106 is extended from motor assembly 108 and is attached to rod 111 in order to provide anti-torque or anti-rotation support for motor assembly 108. It may be attached to rod 111 using a hook-and-loop fastener or various other methods. Stabilization member 106 may also be attached to other suitably stable regions such as reel stem 112, reel foot 114, or a non-rotating part of fishing reel 110. Furthermore, stabilization member 106 may also have a hinge or joint on one or both ends to aid in attachment and alignment. In other embodiments, stabilization member 106 can be replaced with the use of a hook-and-loop fastener or belt that wraps around fishing reel 110 to secure motor assembly 108. A friction material can also be sandwiched between motor assembly 108 and fishing reel 110. Yet other embodiments may include having the user provide the necessary stabilization by holding the device. A further embodiment may rely on the inertia of motor assembly 108 or on the force of gravity for stability during operation.

In an embodiment, user interface 102 contains buttons and LEDs for communicating with the electronics that control motor assembly 108. The buttons provide user input, and the LEDs output information to the user. In other embodiments, the buttons may be replaced with capacitive touch elements. In yet another embodiment, at least portions of user interface 102 may be replaced with a wireless device such as a Bluetooth-enabled smartphone. These and other methods of providing a communications interface between electronics and users are commonly used and are well known to those skilled in the art.

Figure 2:
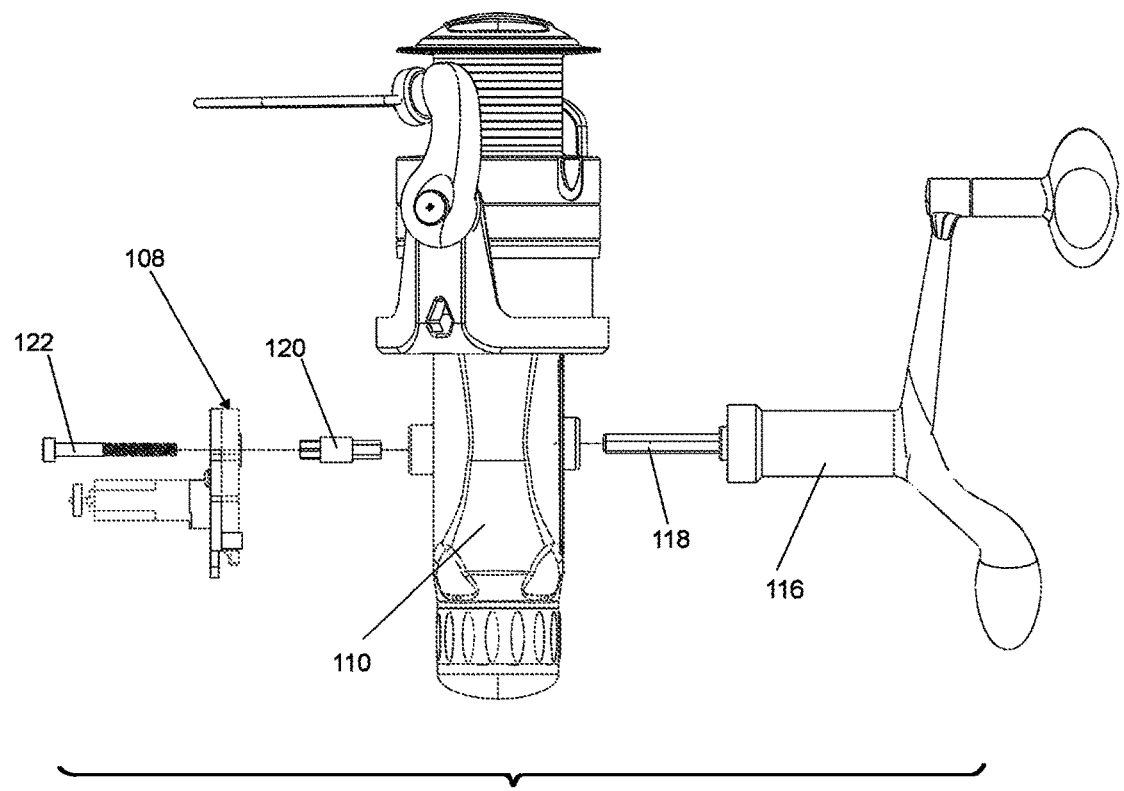
FIG. 2 is an exploded, side view generally illustrating the assembly of the example system of FIG. 1, according to one illustrated embodiment.

FIG. 2 shows an exploded, side view generally illustrating the assembly of the example system of FIG. 1, according to one illustrated embodiment. In this embodiment, a reel adapter 120 rotationally couples motor assembly 108 to fishing reel 110. Motor assembly 108 and reel adapter 120 are sandwiched to fishing reel 110 by using attachment fastener 122 which interfaces to reel handle shaft 118 that extends out of reel handle 116. In this embodiment, attachment fastener 122 is a screw that engages a threaded portion of reel handle shaft 118. As attachment fastener 122 and reel handle shaft 118 are fastened together, motor assembly 108 and reel adapter 120 become sandwiched to fishing reel 110.

This system of attachment allows motor assembly 108 to be operationally coupled with many commonly available fishing reels that a fisherman may already own. A reel adapter 120 with an appropriately matching interface can be used for each fishing reel 110. This can be accomplished by using the same interface as reel handle shaft 118, which is already configured to operate with fishing reel 110 and is included with it. Similarly, attachment fastener 122 can be selected to be a bolt with a thread that properly mates with the threads of the existing reel handle shaft 118.

Figure 3:
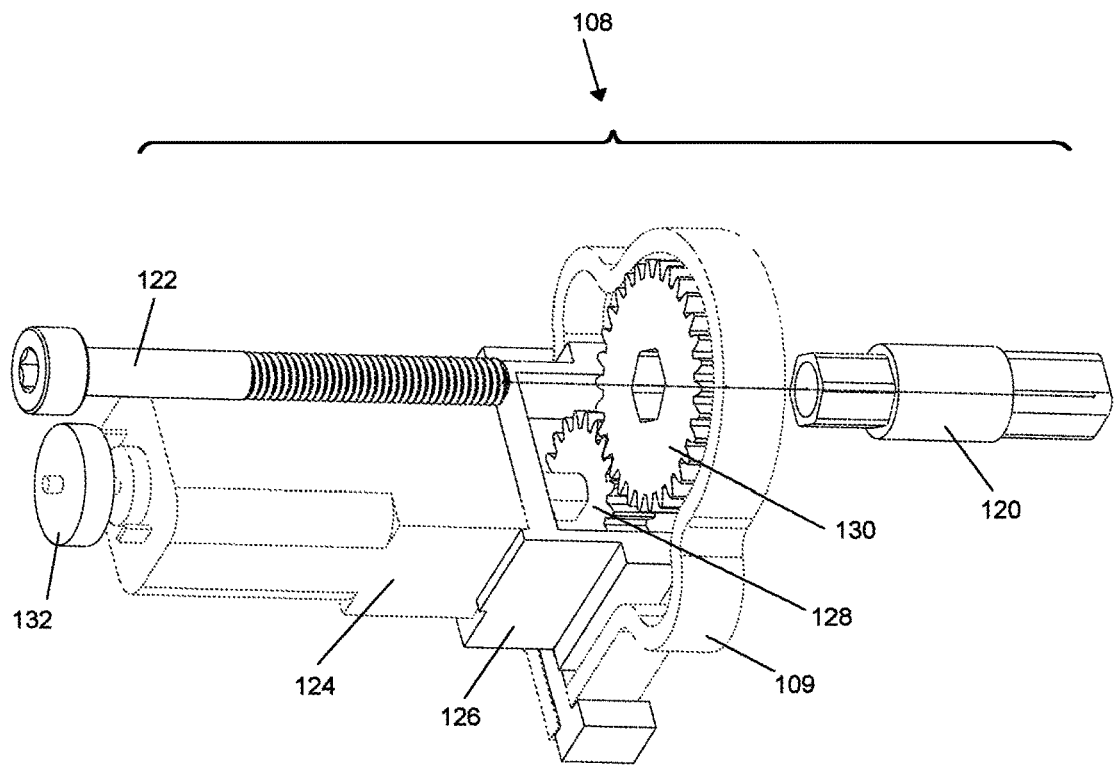
FIG. 3 is an exploded, perspective view of the motor assembly of FIG. 1 with a portion of a housing cut away to show certain internal components, according to one illustrated embodiment.

FIG. 3 shows an exploded, perspective view of motor assembly 108 with a portion of a housing cut away to show certain internal components, according to one illustrated embodiment. Reel adapter 120 has one end that physically mates to output gear 130 contained within motor assembly 108. The other end of reel adapter 120 physically mates to the mechanisms of fishing reel 110. Attachment fastener 122 is inserted through output gear 130, reel adapter 120, and fishing reel 110, until it reaches the mating threads of reel handle shaft 118 that was shown in FIG. 2. As attachment fastener 122 is threaded into reel handle shaft 118, a flanged end of attachment fastener 122 presses against output gear 130 to provide a solid assembly.

Motor assembly 108 includes a motor 124 that drives a pinion gear 128, which transfers torque to output gear 130 that is coupled to reel adapter 120, which then operates fishing reel 110. In an embodiment, an encoder 132 can be attached to motor 124 to measure the amount of rotation.

Encoder 132 is coupled to motor 124 according to conventional methods. It can be a magnetic Hall-effect based encoder, optical encoder, or one of many other position and rotation sensor technologies known to those skilled in the art.

Motor 124 is attached to motor flange 126 which is slidably coupled to motor chassis 109. The coupling of motor flange 126 and motor chassis 109 aligns attached motor 124 to motor chassis 109. The alignment of motor 124 positions attached pinion gear 128 to be engageable to output gear 130.

Other embodiments may use other rotational energy connecting elements such as pulleys, belts, sprockets, or other known methods of operationally coupling a motor to rotating mechanisms. Furthermore, motor 124 may also be integrated as part of the reel operating mechanism, thus not requiring additional assembly.

Figure 4:
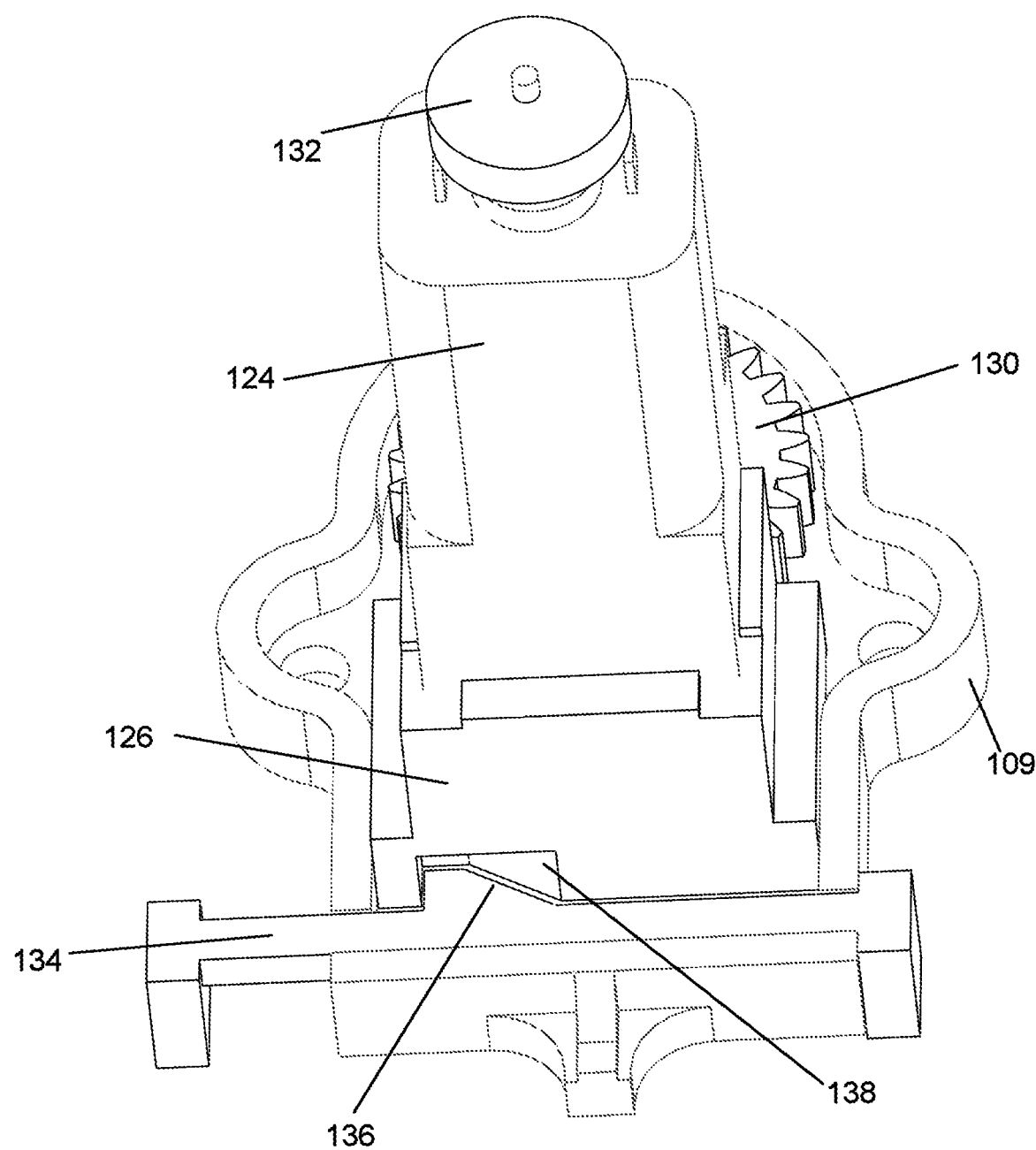
FIG. 4 is a perspective view of the motor assembly of FIG. 1 with a portion of a housing cut away to show certain internal components, according to one illustrated embodiment.

FIG. 4. shows a perspective view of motor assembly 108 from a different angle. In this embodiment, a motor engagement toggle 134 is shown that can slide along its length within motor chassis 109 such that a portion of it, namely, toggle interface 136, engages with a portion of motor flange 126, namely, motor flange interface 138. The wedge shapes of toggle interface 136 and motor flange interface 138 exert a force on motor flange 126 that is at an angle to the length of motor engagement toggle 134. The angle of this force, along with the slidable coupling of motor flange 126 to motor chassis 109, urges motor flange 126 toward output gear 130. As motor flange 126 moves, so do attached motor 124 and pinion gear 128. This lateral movement of motor engagement toggle 134 allows selectively engaging pinion gear 128 to output gear 130.

When motor engagement toggle 134 is positioned such that it does not urge motor flange 126 toward output gear 130, the force of gravity as well as the reaction force between mating teeth of pinion gear 128 and output gear 130 will move motor flange 126 such that pinion gear 128 disengages from output gear 130. Alternatively, a return spring (not shown) can be used to move motor flange 126 to disengage pinion gear 128 from output gear 130. Thus, with motor 124 rotationally uncoupled from fishing reel 110, reel handle 116 is free to operate fishing reel 110 without the added drag from motor 124.

In other embodiments, many other mechanisms exist that can selectively couple motor 124 with fishing reel 110. For example, one can use a friction clutch, the toggle mechanism of a click-type pen, a mechanical switch that disengages the gears by moving one along the axis of the motor shaft, a belt system where the idler pulley is moved to provide slack in the belt, etc.

Figure 5:
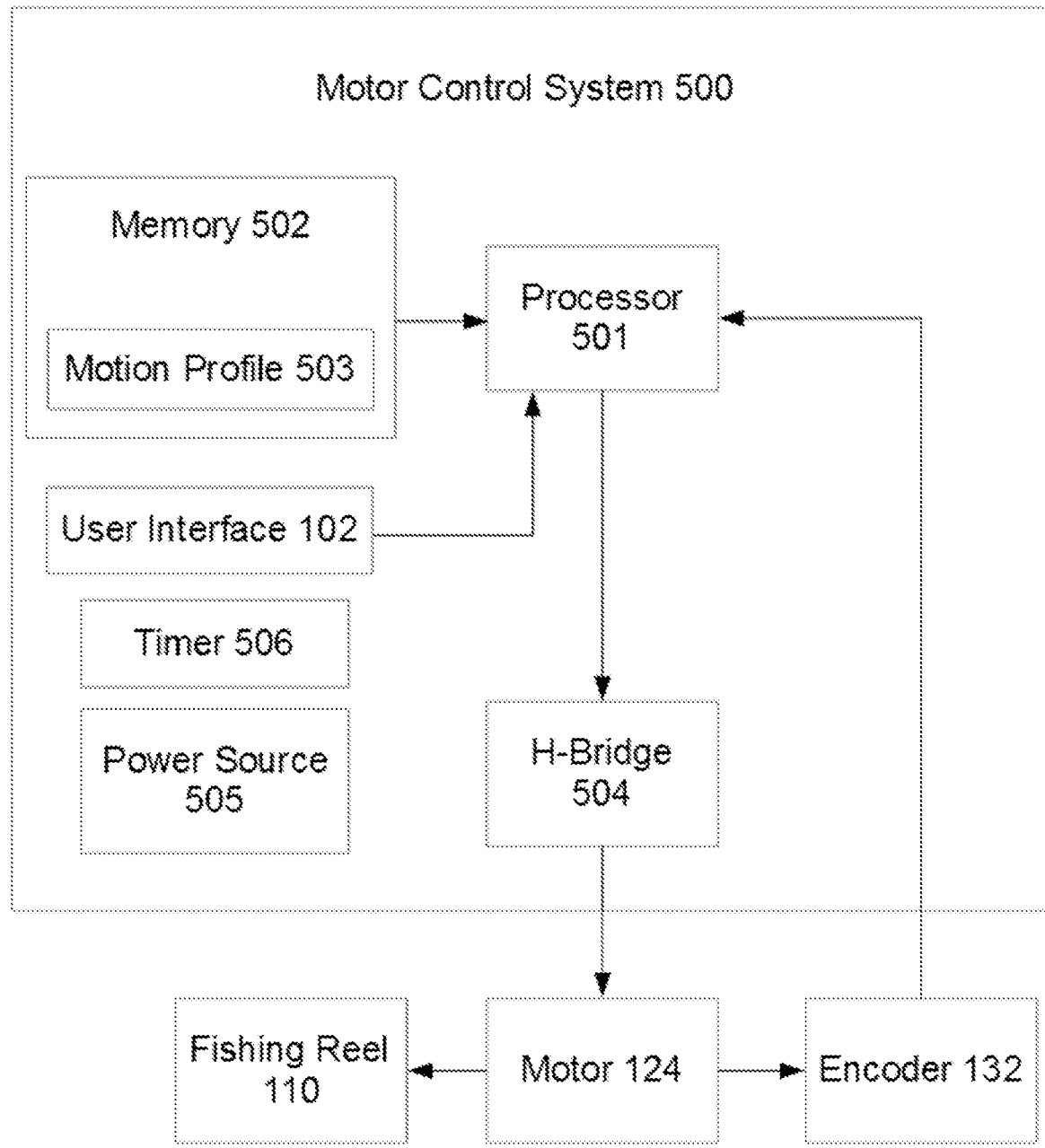
FIG. 5 is an example in which embodiments of a system to attract and catch fish can be implemented.

FIG. 5 shows an example implementation of a system to attract and catch fish. A motor control system 500 comprising a processor 501, a memory 502, a motion profile 503, a timer 506, a power source 505, user interface 102, and an H-bridge 504 powers motor 124 which then operates fishing reel 110 to produce desired motion. Encoder 132 provides rotational position information to processor 501.

Power source 505 can include batteries or other appropriate sources of electrical power, which are well known to those skilled in the art.

Many appropriate options exist for processor 501 and are known to those skilled in the art. One particular example of an appropriate processor is PIC18F45K20 manufactured by Microchip Technology Inc. of Chandler, Ariz. It contains memory for storing software and a plurality of motion profiles, as well as having input and output ports that can interface to buttons, sensors, and various user-interfaces. It can also generate Pulse Width Modulated (PWM) signals to H-bridge circuitry for commanding various signals to a motor These functions and capabilities, including the appropriate circuitry, are well known to those skilled in the art.

Motion profile 503 contains specific information for the motion to be commanded to motor 124. This motion is a function of time and motor position. In other embodiments it can be a function of only time or only position. Accordingly, very detailed time-varying motions can be produced at the fishing line and lure to attract fish.

Figure 6:
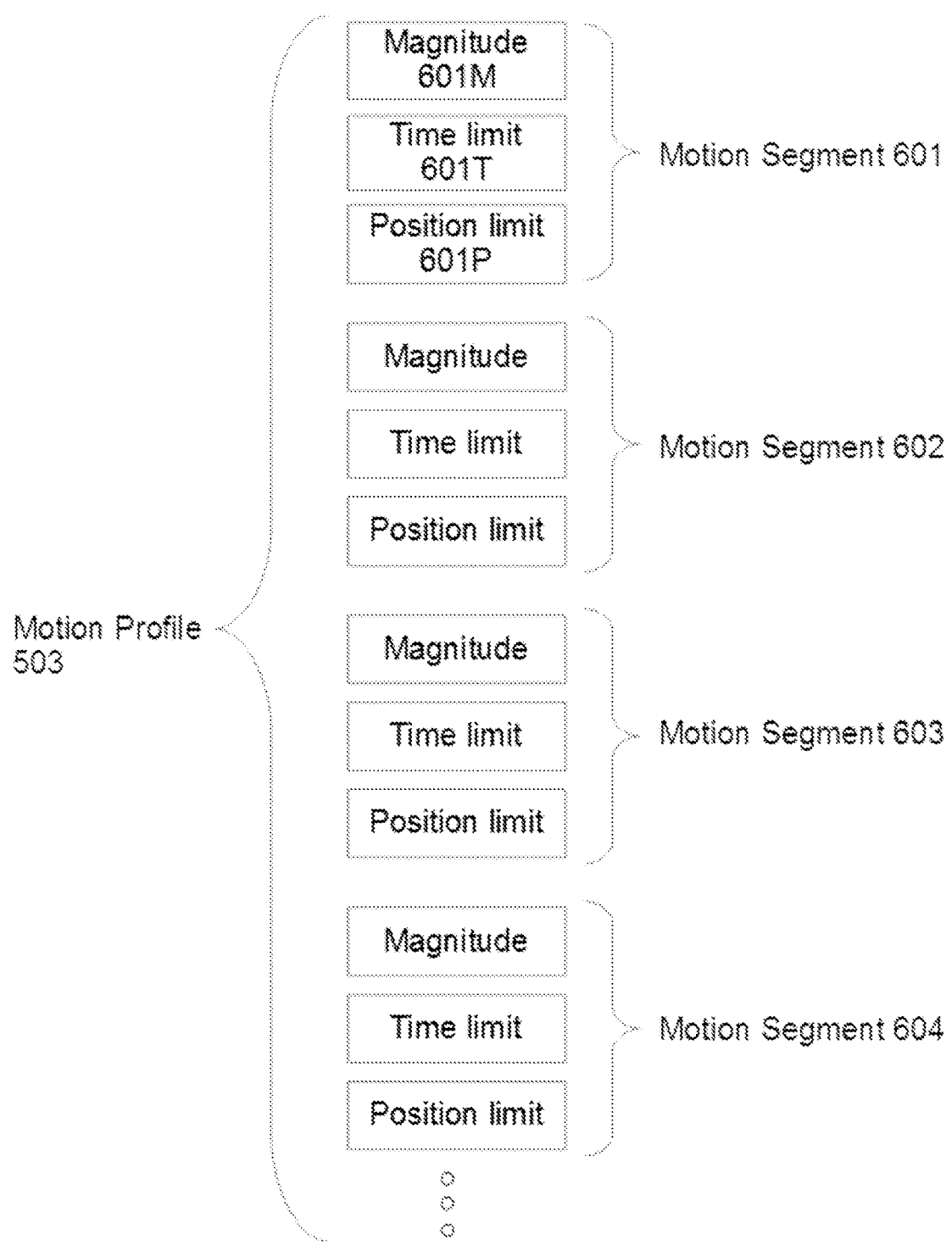
FIG. 6 is an example of one embodiment of a motion profile for use with the motion control system of FIG. 5.

FIG. 6 shows an example of one embodiment of motion profile 503 used in motion control system 500 of FIG. 5. In this embodiment, motion profile 503 comprises a plurality of motion segments, identified as motion segment 601, motion segment 602, motion segment 603, and motion segment 604. The number of motion segments shown is simply for illustration and should not be interpreted as a limit on the number of motion segments that motion profile 503 may contain.

Motion segment 601 contains information for a first motion. Each of the subsequent motion segments, namely motion segment 602, motion segment 603, motion segment 604, etc. contains information for subsequent motions. In this embodiment, motion segment 601 contains a motor control signal magnitude 601M, a time limit 601T, and a position limit 601P.

In other embodiments, only a magnitude 601M and time limit 601T, or only a magnitude 601M and position limit 601P may be used. Another embodiment can contain only a magnitude 601M and no additional information, with the inherent understanding that each magnitude 601M is for a known duration of time. For example, each magnitude 601M could be for a time limit of 0.1 seconds. Similarly, each magnitude 601M could be understood to be for a particular amount of position change. Various combinations of magnitude, time limit, and position limit can be assembled into a motion profile.

Figure 7:
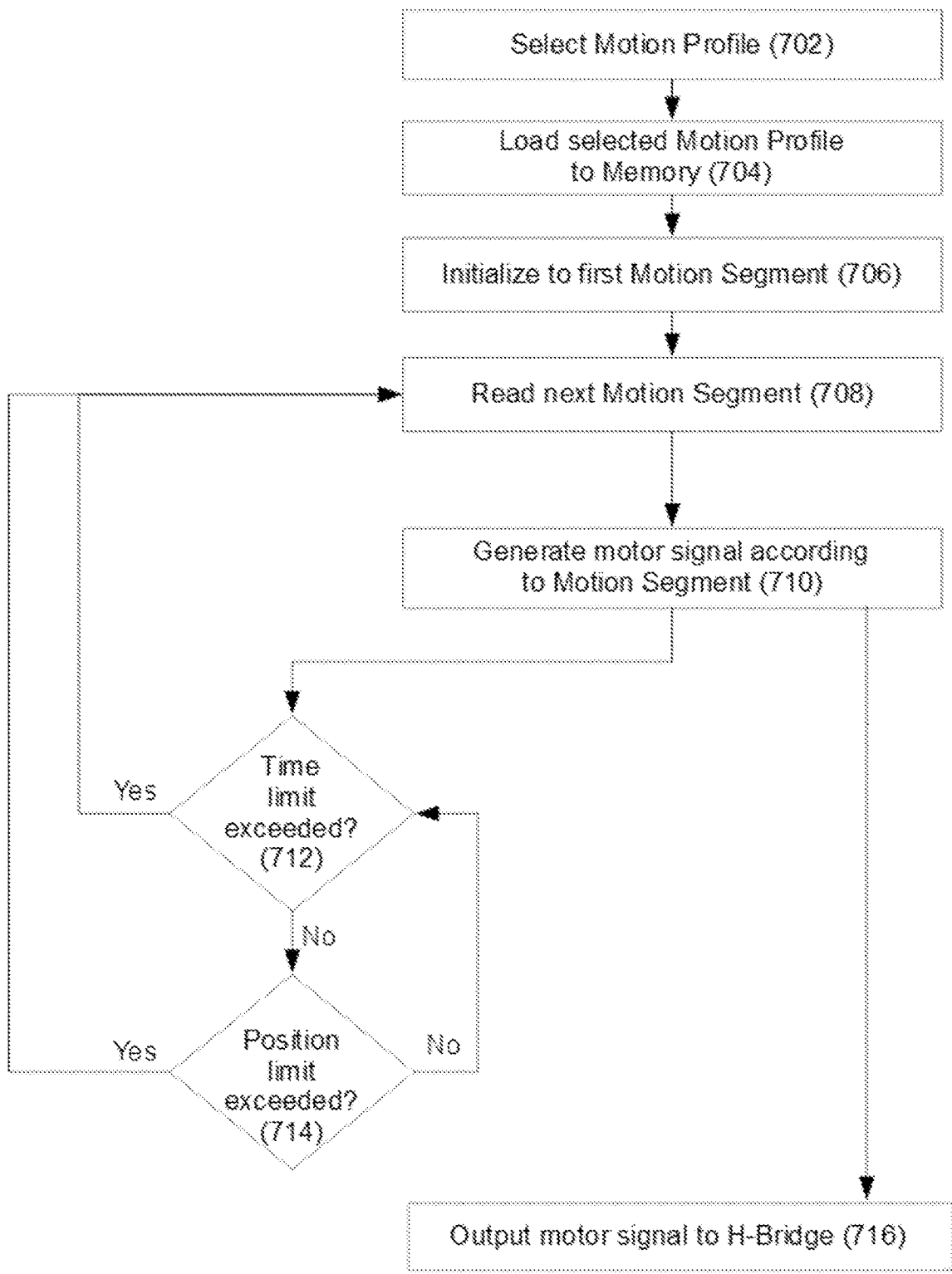
FIG. 7 illustrates an example method of generating a motor control signal from a predetermined motion profile according to one embodiment.

FIG. 7 shows an example method for use with processor 501 of motion control system 500 of FIG. 5. The blocks of this flowchart are detailed as follows.

In block 702, processor 501 identifies motion profile 503 based on the user selection. This can correspond to the user pushing a button on user interface 102 that corresponds to the desired, predetermined motion profile. Other methods of identifying the user selection can be through a menu system that allows the user to scroll through various profiles and selecting one. There are many approaches to fulfilling this step that are known to those familiar with the art.

In block 704, motion profile 503 is loaded into memory 502 that is accessible to processor 501. This process is also commonly known to those skilled in the art.

In block 706, a pointer or memory location tracker is initialized to the beginning of motion profile 503. With reference to FIG. 6, this would correspond to motion segment 601 being the next motion segment. The use of such pointers is commonly known to those skilled in the art.

In block 708 of FIG. 7, the next motion segment is read. For the embodiment shown in FIG. 6, this would be motion segment 601 which comprises a magnitude 601M, a time limit 601T, and a position limit 601P.

In block 710 of FIG. 7, magnitude 601M is converted to a corresponding PWM signal for output to H-bridge 504. At this point, the current values of timer 506 and the motor position from encoder 132 are also captured.

In block 716, the PWM signal from block 710 is output to H-bridge 504 for activating motor 124 of motion control system 500.

Block 712 of FIG. 7 calculates the elapsed time relative to the value of timer 506 that was captured in block 710, and compares this elapsed time to time limit 601T read in block 708. If the calculated elapsed time has exceeded time limit 601T, the software moves on to read the next motion segment according to block 708. If time limit 601T has not been exceeded, the software continues to block 714.

Block 714 calculates the motor position change relative to the motor position value captured in block 710, and compares this position change to position limit 601P read in block 708. If the calculated position change has exceeded position limit 601P, the software moves on to read the next motion segment according to block 708. If position change 601P has not been exceeded, the software loops back to block 712.

This process continues such that each motion segment of motion profile 503 is read and executed to result in a dynamic jigging motion at the bait that corresponds to predetermined motion profile 503.

Another embodiment may repeat motion profile 503 after it is completed. Yet another embodiment may require the user to hold a button on user interface 102 to continue operating motor 124. Still another embodiment may allow the user to remotely control the system through the use of wireless communication. These embodiments may also be combined with other functionality such as commands to continuously reel the fishing line in, "setting the line" (suddenly pulling the fishing line at an increased speed for a short period of time to hook the fish), etc.

Other embodiments may automatically switch between various motion profiles to improve the yield of catching fish. Some embodiments may execute a motion profile 503 while altering its predetermined characteristics to achieve different jigging behaviors. For example, an offset can be added to the magnitudes of motion profile 503 in order to compensate for a heavier bait. Similarly, an offset can be applied to time limits or position limits to account for a different gear ratio used by fishing reel 110.

In one or more embodiments, motion profiles may be transferred to or from the list of motion profiles available to the user. The motion profiles can be transferred using methods commonly known to those skilled in the art. These can include, but are not limited to, a wired connection such as USB cables and wireless connections such as Bluetooth or WiFi.

In one or more embodiments, motion profile 503 can include reversing the direction of motion. For example, at any point during or after jigging, the reel may be commanded to spin in reverse to release more line. This can be used to form an ongoing cycle of reeling in the bait using automated jigging, followed by returning the bait to an earlier position.

Although embodiments of a system for attracting and catching fish have been described in language specific to features and/or methods, the appended claims are not necessarily limited to the specific features or methods described. Rather, the specific features and methods are disclosed as example implementations of a system for attracting and catching fish.

The invention claimed is:

1. A system for attracting fish, comprising:
 a. a fishing reel on which is stored a length of fishing line;
 b. a motor assembly that is located on one side of said fishing reel and which is operationally coupled to said fishing reel via a fastener passing from said one side of said fishing reel through both said motor assembly and a reel adapter and attaching to a reel handle shaft on a reel handle that is located on an other side of said fishing reel, said motor assembly comprising a motor which is attached to a motor flange having a motor flange interface;
 c. a means for controlling said motor, said means for controlling comprising a memory and a processor, said processor being programmed to execute a software program that is resident in said memory that is operative to generate a motor control signal; and
 d. a means for selectively operationally decoupling said motor from said fishing reel, said means for selectively operationally decoupling said motor from said fishing reel comprising a motor engagement toggle movable between first and second positions, said motor engagement toggle comprising a toggle interface, which in said first position, can engage and urge said motor flange interface to cause the motor to couple to said fishing reel and, which in said second position, does not urge said motor flange interface to cause the motor to couple to said fishing reel.

2. The system of claim 1, further comprising a motion profile, whereby, said software generates said motor control signals according to said motion profile.

3. The system of claim 2, further comprising a means for transferring said motion profile to said memory.

4. The system of claim 3, further comprising an encoder, whereby said encoder measures a rotational position of said motor.

5. The system of claim 2, further comprising an encoder, whereby said encoder measures a rotational position of said motor.

6. The system of claim 1, further comprising an encoder, whereby said encoder measures a rotational position of said motor.

7. A system for attracting fish, comprising:
 a. a fishing reel on which is stored a length of fishing line;
 b. a motor assembly that is located on one side of said fishing reel and which is operationally coupled to said fishing reel via a fastener passing from said one side of said fishing reel through both said motor assembly and a reel adapter and attaching to a reel handle shaft on a reel handle that is located on an other side of said fishing reel, said motor assembly comprising a motor which is attached to a motor flange having a motor flange interface;
 c. a predetermined motion profile;
 d. a memory for storing said predetermined motion profile;
 e. a processor for converting said predetermined motion profile into a drive signal for said motor, whereby a jigging motion is imparted to said fishing line; and
 f. a means for selectively operationally decoupling said motor from said fishing reel, said means for selectively operationally decoupling said motor from said fishing reel comprising a motor engagement toggle movable between first and second positions, said motor engagement toggle comprising a toggle interface, which in said first position, can engage and urge said motor flange interface to cause the motor to couple to said fishing reel and, which in said second position, does not urge said motor flange interface to cause the motor to couple to said fishing reel.

8. The system of claim 7, further comprising a means for transferring a plurality of said motion profiles to said memory.

9. The system of claim 7, further comprising an encoder, whereby said encoder measures a rotational position of said motor.

10. A method for attracting fish, comprising:
   a. providing a fishing reel on which is stored a length of fishing line;
   b. providing a motor assembly that is located on one side of said fishing reel and which is operationally coupled to said fishing reel via a fastener passing from said one side of said fishing reel through both said motor assembly and a reel adapter and attaching to a reel handle shaft on a reel handle that is located on an other side of said fishing reel, said motor assembly comprising a motor which is attached to a motor flange having a motor flange interface;
   c. providing a predetermined motion profile contained in an electronic memory;
   d. providing a processor for generating a motor control signal from said predetermined motion profile to operate said motor, whereby a jigging motion is imparted to said fishing line; and
   e. providing a means for selectively operationally decoupling said motor from said fishing reel, said means for selectively operationally decoupling said motor from said fishing reel comprising a motor engagement toggle movable between first and second positions, said motor engagement toggle comprising a toggle interface, which in said first position, can engage and urge said motor flange interface to cause the motor to couple to said fishing reel and, which in said second position, does not urge said motor flange interface to cause the motor to couple to said fishing reel.

11. The method of claim 10, further comprising: receiving said predetermined motion profile which further comprises a plurality of motion profiles into said memory.

12. The method of claim 10, further comprising: actuating said means for selectively operationally decoupling said motor from said fishing reel.

13. The method of claim 12, further comprising: receiving said predetermined motion profile which further comprises a plurality of motion profiles into said memory.

* * * * *